US008514893B2

(12) United States Patent
Spransy et al.

(10) Patent No.: US 8,514,893 B2
(45) Date of Patent: Aug. 20, 2013

(54) DIGITAL VIDEO APPARATUS FOR MULTIPLEXING SINGLE PROGRAM TRANSPORT STREAMS INTO A MULTIPLE PROGRAM TRANSPORT STREAM

(75) Inventors: Matthew George Spransy, Oconomowoc, WI (US); Joseph Michael Nordman, West Bend, WI (US); Carl Alan Pick, West Bend, WI (US)

(73) Assignee: Videopropulsion Interactive, Inc., Slinger, WI (US)

( * ) Notice: Subject to any disclaimer, the term of this patent is extended or adjusted under 35 U.S.C. 154(b) by 380 days.

(21) Appl. No.: 13/004,919

(22) Filed: Jan. 12, 2011

(65) Prior Publication Data

US 2012/0177066 A1 Jul. 12, 2012

(51) Int. Cl.
*H04N 21/23* (2011.01)
(52) U.S. Cl.
USPC ............ 370/487; 370/486; 375/240; 725/109
(58) Field of Classification Search
USPC .......................... 370/466, 473, 486, 535, 537
See application file for complete search history.

(56) References Cited

U.S. PATENT DOCUMENTS

| 5,835,493 | A | * | 11/1998 | Magee et al. | 370/395.62 |
|---|---|---|---|---|---|
| 5,862,140 | A | * | 1/1999 | Shen et al. | 370/468 |
| 6,301,264 | B1 | * | 10/2001 | Holm | 370/465 |
| 6,804,259 | B1 | * | 10/2004 | Onagawa | 370/476 |
| 7,554,612 | B2 | * | 6/2009 | Chidambaram et al. | 348/714 |
| 7,602,820 | B2 | * | 10/2009 | Helms et al. | 370/535 |
| 8,218,651 | B1 | * | 7/2012 | Eshet et al. | 375/240.26 |
| 8,300,541 | B2 | * | 10/2012 | Cholas et al. | 370/252 |
| 8,321,903 | B2 | * | 11/2012 | Peterfreund | 725/109 |
| 2005/0027786 | A1 | * | 2/2005 | Kim et al. | 709/200 |
| 2005/0101246 | A1 | * | 5/2005 | Choi et al. | 455/3.01 |
| 2006/0088052 | A1 | * | 4/2006 | Sauser et al. | 370/466 |
| 2007/0147429 | A1 | * | 6/2007 | Shi et al. | 370/473 |
| 2010/0150182 | A1 | * | 6/2010 | Noronha, Jr. | 370/537 |
| 2010/0189122 | A1 | * | 7/2010 | Dandekar et al. | 370/412 |

OTHER PUBLICATIONS

MPEG-2 Transmission.*

* cited by examiner

*Primary Examiner* — Hassan Kizou
*Assistant Examiner* — Emmanuel Maglo
(74) *Attorney, Agent, or Firm* — Quarles & Brady LLP; George E. Haas

(57) ABSTRACT

An apparatus for transporting digital multimedia receives signals for a plurality of single program transport streams (SPTS). Each SPTS is transmitted as a series of groups of a predefined number of transport stream packets. An input buffer that receives the packets is configured to hold only the predefined number of packets at any point in time. A table builder receives packets from the input buffer and assigns a set of unique packet identifiers to the packets from each SPTS, reconfigures each program map table in the packets, and generates a program association table for a multiple program transport stream (MPTS). The table builder retains unaltered the program clock reference in the data packets. A first-in, first-out buffer combines packets received from the table builder into a MPTS. An output stage modulates a carrier signal, such as for a television channel, with the MPTS.

20 Claims, 2 Drawing Sheets

IP EDGE MULTIPLEXER 18

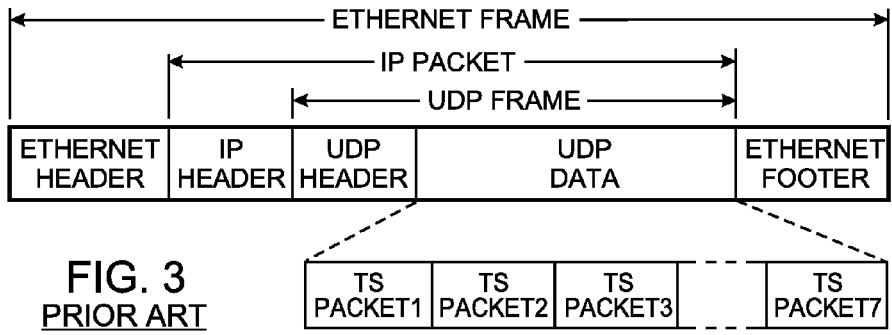
FIG. 3 PRIOR ART
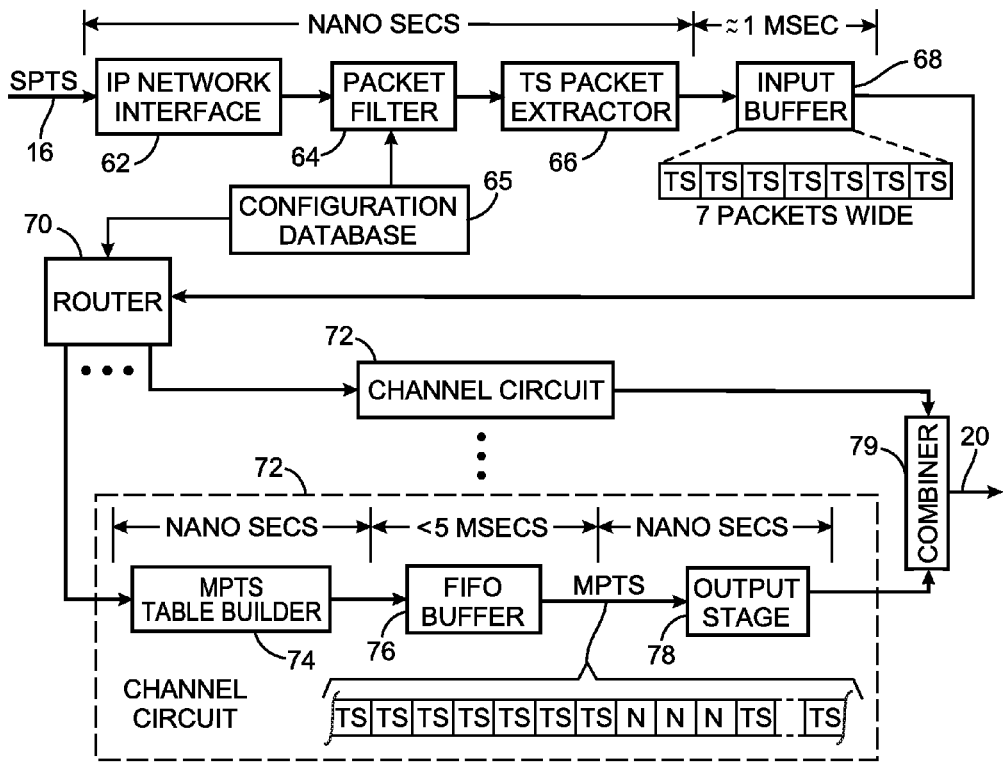
FIG. 4   IP EDGE MULTIPLEXER 60

DIGITAL VIDEO APPARATUS FOR MULTIPLEXING SINGLE PROGRAM TRANSPORT STREAMS INTO A MULTIPLE PROGRAM TRANSPORT STREAM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to systems and methods for transporting digital multimedia signals, such as television programs, to customer equipment, and more particularly to audio-video program distribution systems that convert a plurality of single program transport streams into a multiple program transport stream.

2. Description of the Related Art

Today television programs are distributed digitally using the MPEG2 protocol defined by ISO/IEC 13818-1 standard that describes a method and data format of packetizing compressed digital audio-video information for serial transmission. According to the MPEG2 protocol, the compressed video and audio program data are divided into transport packets having a common length of 188 bytes. The transport packets for the same program form a single program transport stream (SPTS) and when the packets from more than one SPTS, i.e. more than one program, are multiplexed onto a common carrier the result is a multiple program transport stream (MPTS).

Besides the program signal data, each transport packet includes a packet identifier (PID) field containing a value that distinguishes each kind of transport packet for a given program from other kinds, e.g. video packets from audio packets. The MPEG2 transport packets also carry program specific information (PSI), which includes a program association table, a program map table, and a program clock reference. The program map table (PMT) lists the packet identifiers associated with one single program transport stream and the program association table (PAT) lists the packet identifiers for the packets that contain the program map tables for each single program transport stream that has been multiplexed into a given multiple program transport stream. The program clock reference (PCR) contains timing information that enables a decoder to synchronize the program content carried in different packets for the same program, such as matching the audio tracks with the associated video.

In a typical cable television program distribution system 10, such as the one depicted in FIG. 1, the MPEG2 program content is obtained at the system's head end from a plurality of MPEG2 program sources 11-12, such as television networks using earth orbiting satellites, over the air broadcast stations, and other content providers. The MPEG2 program sources 11-12, often include on-demand movies and locally generated programs, such as from a municipal government or a school district. It should be understood that the head end frequently receives a hundred or more programs, each representing a single program transport stream of MPEG2 packets.

As used herein a "program" includes, but is not limited to, television programs, a sequence of video images, a video game, a video image produced by a computer system, and a video image produced from a storage medium.

An Internet protocol (IP) network interface 14 at the head end places a group of MPEG2 packets for the same program into an Internet protocol packet that is then inserted into an Ethernet frame for transmission. The Ethernet frames are sent from the head end over a fiber optic cable of an IP network 16.

FIG. 3 graphically depicts the format of one Ethernet frame. A group of seven MPEG2 transport stream (TS) packets from one of the program sources 11-12 forms the data field of a User Datagram Protocol (UDP) frame. The UDP frame also includes a header that, among other things, contains an identifier denoting the program source from which the UDP data originated and thus the source of the accompanying TS packets. The UDP frame is placed within a standard Internet protocol packet that contains a conventional IP header. In turn, the IP packet is placed within a standard Ethernet frame and is bounded in that frame by a conventional Ethernet header and a conventional Ethernet footer. Each SPTS comprises a sequence of these Ethernet frames carrying the data for the respective program.

Referring again to FIG. 1, the fiber optic cable of the IP network 16 terminates at a cluster of end users. For example, a cluster may be a section of a municipality having approximately 500 homes or a large hotel. At the remote terminus of the of the IP network 16, an IP edge multiplexer 18 (commonly referred to as an "Edge QAM") extracts the MPEG2 TS packets for each program from the Ethernet frames and uses the TS packets to modulate a radio frequency (RF) carrier for a given television channel that is the carry the associated program. The resultant plurality of modulated RF carriers are combined and fed onto an RF network 20 that usually employs a coaxial cable to distribute the television programs to consumer premises throughout the service area defined by the cluster.

At a consumer premise, the RF network 20 is connected to a separate decoder 21, 22, or 23 which allows the people at that premise to select a particular program by tuning the decoder to the corresponding television channel. The decoder 21-23 either translates the RF television signal on the received channel into another predefined common output channel (e.g., channel 3) or converts the RF television signal into a composite audio-video signal. In either conversion case, the output from the respective decoder 21, 22 or 23 is applied to an associated display device 24, 25 or 26, respectively, which in this instance is a digital television receiver.

With reference to FIG. 2, a conventional IP edge multiplexer 18 comprises an IP network interface 30 to which the fiber optic cable of the IP network 16 connects and which converts the optical signal into an electrical signal carrying the Ethernet frames. The electrical signal is then applied to an IP stack 32 that recovers the MPEG2 transport stream (TS) packets from each Ethernet frame. Those TS packets are then fed to an input buffer 34 in which they are stored temporarily in a manner that identifies their associated program. When data for a particular program is required for further processing one or more of the associated TS packets are read from the input buffer and directed by a router 36 to a channel circuit 38 for the particular television channel that has been designated to carry the respective program. It should be understood that a given television channel can carry several digital television programs at the same time on different sub-channels. Each channel circuit 38 multiplexes the packets of the SPTS's of those individual television programs into a MPTS that then modulates the RF Carrier for the respective television channel.

To simplify the explanation, the transmission of program data through the IP edge multiplexer 18 will be described in the context of one SPTS, with the understanding that TS packets for a plurality of programs are processed sequentially in the same manner. As each Ethernet frame is received, its group of TS packets is extracted and placed into the input buffer 34. The conventional input buffer 34 simultaneously stores groups of transport streams packets from a large number of Ethernet frames and thus for a plurality of separate programs. The input buffer 34 is implemented by a very large random access memory so that all the incoming TS packets can be stored until one can be processed by the respective channel circuit 38. A relatively large amount of buffer memory is required to provide time for the IP edge multiplexer to construct the program specific information, specifically the program association table and the program map table, for the audio-video content being transported. The size of the input buffer varies dynamically based on the amount of incoming data that has to be stored before the channel circuits 38 can process that data.

The IP stack 32 and the input buffer 34 introduce significant delays in the transmission of the TS packets for each program. Specifically, the IP stack 32 introduces an indeterminate and varying delay, which can be in the microseconds range and thereafter the input buffer 34 introduces another delay that can be up to an additional three to four seconds. Because of the magnitude and uncertainty of these delays at any point in time, a considerable latency in the signal processing occurs.

When a TS packet for a particular program is finally read out of the input buffer 34, the router 36 conveys that packet to the appropriate channel circuit 38 for the television channel that has been predefined carry the respective program. Each channel circuit has a similar configuration with one of them being shown in detail in FIG. 2. Specifically, the channel circuit 38 has a multiplexer 40 that requests data from the input buffer 34 at the proper timing rate needed to produce the television channel output signal. Because the RF signal for a standard television channel is able to carry multiple digital television programs at the same time, the multiplexer's function is to create a transport stream containing the TS packets for those multiple programs. Thus, the multiplexer takes TS packets for a single program transport stream and inserts them into a multiple program transport stream for the respective television channel. In the course of that processing the multiplexer utilizes the PCR timing information embedded in each program's SPTS to determine when to insert the TS packets into the multiplex buffer 42. Because of the relatively large and often uncertain dynamically varying delays in the IP stack 32 and the input buffer 34, the internal multiplexer 40 has to restamp the TS packets with a new program clock reference (PCR). The multiplexer 40 also generates a new program map table and a new program association table to ensure proper construction of the MPTS.

In order to create the proper timing of the MPTS, the multiplexer often outputs null packets between the TS packets as necessary so that the output stage 44 can obtain the data at a constant rate that is higher than the rate at which the SPTS packets were received by the multiplexer 40. The resultant sequence of packets from the multiplexer 40 is placed into a multiplex buffer 42 to construct the multiple program transport stream in which single TS packets interspersed with groups of multiple null packets, see the data stream depicted at the bottom of the channel circuit in FIG. 2. The multiplex buffer 42 also enables in order that an output stage 44 can obtain the data at a constant rate that is higher than the rate at which the SPTS packets were received by the multiplexer 40.

The output stage 44 clocks the data packets out of the multiplex buffer 42 at a constant rate and then modulates the appropriate RF carrier for the designated television channel with that data. Because such television signal generation utilizes quadrature amplitude modulation, the this type of IP edge multiplexer is often referred to as an "edge QAM."

A delay of the magnitude introduced by standard IP edge multiplexers 18 is acceptable for delivery of audio-video content, that is not typically considered to be time sensitive, especially in the case of a standard television program being delivered over a one-way broadcast network.

More recently, however, most cable television systems have been converted to two-way networks in order to provide interactive applications, such as video game playing, graphical menu systems, and on-demand movies with the ability for the viewer to pause and slow the speed at which the program is delivered. Unfortunately, most previous IP edge multiplexers were not fast enough to deliver that kind of programming from the head end in near real-time. Delays encountered in conventional multiplexers produced an unacceptable lag time between when a viewer's control input was sent upstream until the program produced a visual response on the television set.

As a consequence, it is desirable to provide an IP edge multiplexer that has a low latency between receiving a program packet from the optical fiber and applying the program data as an radio frequency channel signal onto the coaxial cable leading to the consumer's premises.

SUMMARY OF THE INVENTION

An apparatus is provided for multiplexing a plurality of single program transport streams into a multiple program transport stream. Each single program transport stream is formed by a series of groups of a predefined number of data packets, in which each data packet contains a packet identifier. Each single program transport stream carries a program map table that identifies packet identifiers associated with that respective single program transport stream. The multiple program transport stream carries a program association table that identifies the program map tables for the plurality of single program transport streams that are multiplexed into the multiple program transport stream.

The apparatus comprises an input buffer that receives data packets of the plurality of single program transport streams and that is configured to hold only the predefined number of data packets at any point in time. An MPTS table builder receives data packets from the input buffer, reassigns a set of unique packet identifiers to the data packets from each single program transport stream, reconfigures each program map table in the data packets with the set of unique packet identifiers for the respective single program transport stream, and generates a program association table that identifies the program map tables for the plurality of single program transport streams. Nevertheless, the MPTS table builder retains unaltered the program clock reference in the data packets. A first-in, first-out buffer is operably connected to combine data packets received from the MPTS table builder into a multiple program transport stream. For example, the first-in, first-out buffer is a ring type buffer.

A specific embodiment of the apparatus, further includes an output stage that receives the multiple program transport stream and modulates a carrier signal with the multiple program transport stream. In a particular case, the carrier signal is associated with a television channel.

One aspect is that the present Internet protocol edge multiplexer, by employing fixed size buffers through which the TS packets are clocked in a first-in, first-out manner, provides a constant and determinate latency in the processing of those packets. Furthermore, the signal processing relies on timing that is derived from the rate at which the TS packets are received from the IP network and processes that TS packets in the identical order in which they were received, thereby maintaining the origination timing among the packets for the same program SPTS. This later feature eliminates the requirement of recalculating the program clock reference for the TS packets, as in prior edge multiplexers. These features significantly reduce the processing delay as comparing to conventional edge multiplexer, thereby enabling faster response times between a user input and a change in the display of an interactive system.

BRIEF DESCRIPTION OF THE DRAWINGS

FIG. 3 is a graphical depiction of an Ethernet frame that carries data for a television program through part of the program distribution system; and FIG. 4 is a block diagram of an Internet protocol edge multiplexer according to the present invention.

DETAILED DESCRIPTION OF THE INVENTION

Figure 1:
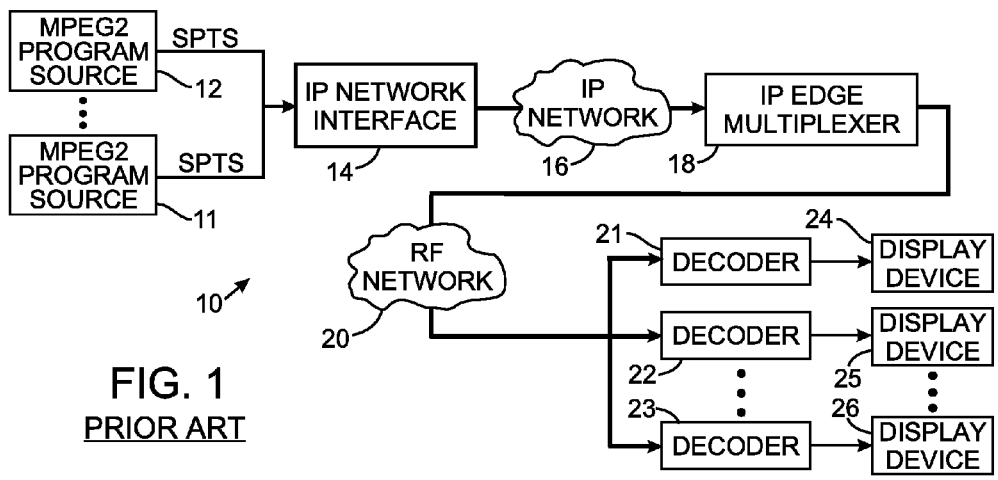
FIG. 1 is a block diagram of a conventional digital television program distribution system.
Figure 2:
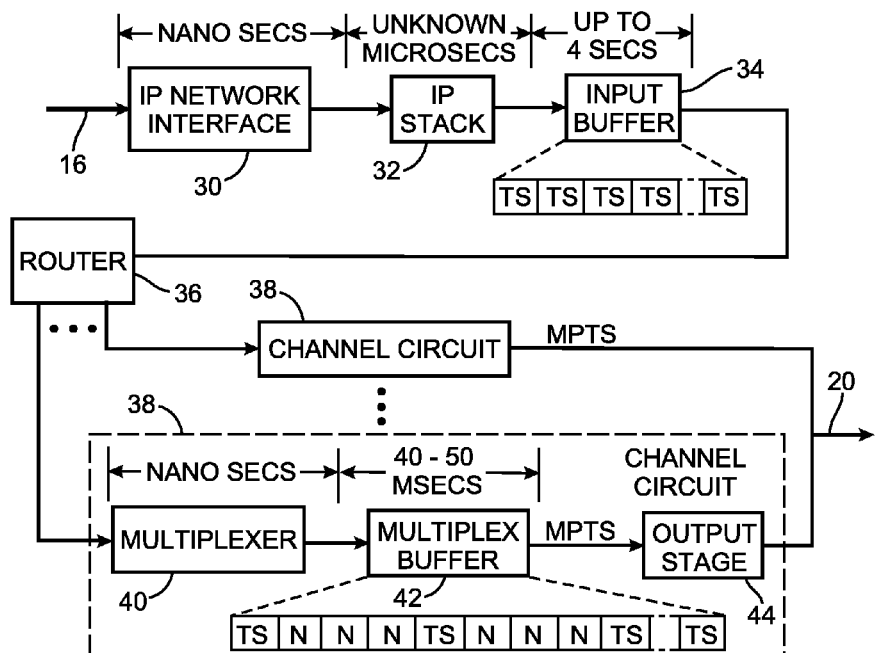
FIG. 2 is a block diagram of an Internet protocol edge multiplexer that has been used in previous digital television program distribution systems.

With reference to FIG. 4, a novel Internet protocol edge multiplexer 60 receives each SPTS in the form of a series of Ethernet frames from the IP network 16. The Ethernet frames are applied to an IP network interface 62 which converts the optical network signal into an electric signal. The resultant electrical signal is applied to a packet filter 64 that selects those Ethernet frames that contain program data to be passed to the RF network 20. Specifically, the packet filter 64 inspects the inbound Ethernet frames discarding those that do not contain a program identifier in the UDP header for which the edge device is configured to process. The IP network can carry other types of data, such as email and other Internet content. The relevant packet identifiers for the IP edge multiplexer 18 are stored within a configuration database 65. As each incoming Ethernet frame is received, the enclosed program identifier is obtained and the configuration database 65 is inspected to see if that program identifier is listed therein. If that is the case, the Ethernet frame is passed by the packet filter 64 to a TS packet extractor 66, which removes the seven TS packets from the UPD frame and sends them to an input buffer 68.

The input buffer 68 is only seven TS packets wide, i.e., it has a fixed size that can accommodate only the data from the group of seven TS packets contained in a single Ethernet frame. It should be appreciated that the present invention may be used with transport streams that transmit packets in groups having more or less than seven packets. The group of TS packets is held within the input buffer 68 for a period of time on the order of one millisecond until the downstream components of the IP edge multiplexer are ready to process that data. Therefore, unlike the input buffer of the traditional edge multiplexer that has a significantly greater amount of storage capacity and simultaneously holds groups of TS packets from many Ethernet frames and many different programs, the new IP edge multiplexer 60 has an input buffer 68 that can only hold only seven TS packets at a time. Further the input buffer 68 does not hold any one TS packet for more than approximately 1 millisecond which is a significantly shorter period of time (more than three orders of magnitude less) than conventional edge QAM input buffers.

When a downstream section of the IP edge multiplexer 60 is ready to process new data, the group of seven TS packets is clocked out of the input buffer 68 and fed through a router 70. The function of the router 70 is to direct the SPTS for a particular program to the appropriate channel circuit 72 for the specific television channel that is designated to carry that program. The configuration database 65 contains a designation of which channel circuit 72 is to receive the TS packets for a particular program. Because TS packets are fed from the packet filter 64 through the TS packet extractor 66 and the input buffer 68 in the same order in which they are received, the program identifier extracted from the Ethernet frame by the packet filter can be used by the configuration database 65 to instruct the router 70 as to which channel circuit 72 to send the TS packet presently being received from the input buffer. Thus, as the seven packets for a given SPTS are clocked out of the input buffer 68, the router 70 sends those packets as a group to the appropriate channel circuit 72.

Each channel circuit 72 has the same circuit configuration with the details for one of them shown in FIG. 4. The TS packet stream from the router 70 is applied to an MPTS table builder 74, that performs several functions. Firstly, the MPTS table builder 74 re-stamps the TS packets for from each SPTS with a new and unique set of packet identifiers (PID) to enable proper multiplexing of that program data into the conventional MPTS output. Note that, the set of packet identifiers used by each SPTS was assigned by its particular MPEG2 program source 11-12 without the ability to know the packet identifiers being assigned by the other program sources to their SPTS's. As a result, it is possible that, when multiple programs are transmitted on the same MPTS, two of them could use at least one identical PID. This possibility is eliminated by the MPTS table builder 74 reassigning new PID's to the TS packets for each SPTS that is being received. The MPTS table builder 74 also then redefines the associated program map table (PMT) with the newly assigned PID's and generates an new program association table, all in accordance with the MPEG2 system standards.

Key to the processing by the MPTS table builder 74 is that the program clock reference (PCR) for the TS packets is not altered, as occurred in previous IP edge multiplexers. Instead, the present IP edge multiplexer 60 relies on timing that is derived from the rate at which the TS packets are received from the IP network. In other words, it is assumed that the TS packets are coming in from the IP network 16 with the proper timing and because each group of seven TS packets is fed through the IP edge multiplexer 60 in the identical order in which they were received, and because the latency of the signal between the input and the output has been significantly reduced, the program clock reference does not need to be recalculated. Thus, the fast throughput of the program data and the fact that the TS packets only can be fed out of the IP edge multiplexer 60 in the same order in which they were received, maintains the respective timing among the packets for the same program SPTS.

The MPTS table builder 74 places the group of seven TS packets into a first-in, first-out (FIFO) buffer 76. The FIFO buffer 76 may be defined in a relatively small random access memory, in comparison to the multiplex buffers used in previous edge devices, with the buffer instantiated in contiguous memory access (DMA) memory locations implemented as a ring buffer. Should the buffer contents exceed a "high water mark", non-priority packets are discarded and do not enter that buffer. A priority bit in the transport stream field header distinguishes non-priority and priority packets. Furthermore, if the FIFO buffer 76 becomes full and the router 70 attempts to overrun that buffer, incoming packets will be dropped which is an error state that implies the timing of the input source stream is incorrect.

Data are clocked out of the FIFO buffer 76 by an output stage 78 at a constant rate. If there is no data in the FIFO buffer, null packets are created and clocked out. This produces an MPTS consisting of groups of seven TS packets from the same SPTS which may be bounded by null packets if necessary to provide a constant data rate for the MPTS. The output stage 78 then modulates an RF carrier with the data in the MPTS according to the modulation protocol for the respective output signal. In the case of an ATSC television signal, the output stage 78 quadrature amplitude modulates a standard RF channel carrier with the MPTS. A combiner 79 combines the resultant RF signal for the associated television channel the channel signals from the other channel circuits 72 to produce the output signal from the IP edge multiplexer 60 that is then fed onto the RF network 20. Although the output stage uses quadrature amplitude modulation (QAM) in the exemplary program distribution system 10, other modulation techniques and different output signal format protocols can be employed.

The multiplexing of multiple incoming SPTS's for different programs occurs by virtue of the order in which the groups of seven TS packets for each SPTS arrive at the input of the FIFO buffer 76. For instance a group of TS packets arrives from a first SPTS and is followed by a pause during which null packets are produced. Then a group of seven packets from a second SPTS, i.e., a different program, arrives at the same channel circuit 72 and is similarly fed through the FIFO buffer 76 and the output stage 78.

The present Internet protocol edge multiplexer 60, by employing fixed size buffers through which the TS packets are clocked in a first-in, first-out manner, provides a constant and determinate latency in the processing of those packets. Furthermore, the signal processing relies on timing that is derived from the rate at which the TS packets are received from the IP network and processes those TS packets in the identical order in which they were received, thereby maintaining the origination timing among the packets for the same program SPTS. This later feature eliminates the requirement of recalculating the program clock reference for the TS packets, as in prior edge multiplexers. In the exemplary IP edge multiplexer being described the seven TS packets extracted from each Ethernet frame are processed as a group. These features significantly reduce the processing delay as comparing to conventional edge multiplexer, thereby enabling faster response times between a user input and a change in the display of an interactive system.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An apparatus for multiplexing a plurality of single program transport streams into a multiple program transport stream, wherein each single program transport stream (SPTS) is formed by a series of groups each having a predefined plurality of data packets, each data packet contains a packet identifier, each single program transport stream carries a program map table that identifies packet identifiers associated with that respective single program transport stream, the multiple program transport stream carries a program association table that identifies the program map tables for the plurality of single program transport streams that are multiplexed onto the multiple program transport stream, said apparatus comprising:
    an input buffer for receiving data packets of the plurality of single program transport streams and configured to hold only the predefined plurality of data packets at any point in time;
    an MPTS table builder that receives data packets from the input buffer and reassigns a set of unique packet identifiers to the data packets from each single program transport stream, reconfigures each program map table in the data packets with the set of unique packet identifiers for the respective single program transport stream, and generates a program association table that identifies the program map tables for the plurality of single program transport streams, wherein the MPTS table builder retains unaltered the program clock reference in the data packets; and
    a first-in, first-out buffer operably connected to combine data packets received from the MPTS table builder into a multiple program transport stream.

2. The apparatus as recited in claim 1 wherein the first-in, first-out buffer is a ring type buffer.

3. The apparatus as recited in claim 1 further comprising a packet filter that receives data from a network and passes only data packets from predetermined single program transport streams to the input buffer.

4. The apparatus as recited in claim 3 further comprising a configuration database containing information specifying the predetermined single program transport streams.

5. The apparatus as recited in claim 1:
    wherein digital data for each group of a plurality number of data packets is received in an Ethernet frame; and
    further comprising a packet extractor that removes the group of a predefined plurality of data packets from the Ethernet frame and forwards the group toward the input buffer.

6. The apparatus as recited in claim 1 further comprising an output stage that receives the multiple program transport stream and modulates a carrier signal with the multiple program transport stream.

7. The apparatus as recited in claim 6 wherein that carrier signal is associated with a television channel.

8. An apparatus for multiplexing a plurality of single program transport streams into a multiple program transport stream, wherein each single program transport stream (SPTS) is formed by a series of groups each having a predefined plurality of data packets, each data packet contains a packet identifier, each single program transport stream carries a program map table that identifies packet identifiers associated with that respective single program transport stream, the multiple program transport stream carries a program association table that identifies the program map tables for the plurality of single program transport streams that are multiplexed onto the multiple program transport stream, said apparatus comprising:
    an input buffer for receiving data packets of the plurality of single program transport streams and configured to hold only the predefined plurality of data packets at any point in time;
    a plurality of channel circuits, each associated with a different output signal channel, and each comprising:
        (a) an MPTS table builder that receives data packets from the input buffer and reassigns a set of unique packet identifiers to the data packets from each single program transport stream, reconfigures each program map table in the data packets with the set of unique packet identifiers for the respective single program transport stream, and generates a program association table that identifies the program map tables for the plurality of single program transport streams, wherein the MPTS table builder retains unaltered the program clock reference in the data packets, and (b) a first-in, first-out buffer operably connected to combine data packets received from the MPTS table builder into a multiple program transport stream; and a router operably connected to receive data packets from the input buffer and send the data packets to one of the plurality of channel circuits designated for the single program transport streams from which each data packet was received.

9. The apparatus as recited in claim 8 further comprising a configuration database connected to the router and containing information specifying which of the plurality of channel circuits is to receive each of the data packets.

10. The apparatus as recited in claim 8 further comprising a signal combiner that combines multiple program transport streams from the plurality of channel circuits at an output of the apparatus.

11. The apparatus as recited in claim 8 wherein the first-in, first-out buffer is a ring type buffer.

12. The apparatus as recited in claim 8 further comprising a packet filter that receives data from a network and passes only data packets from predetermined single program transport streams to the input buffer.

13. The apparatus as recited in claim 12 further comprising a configuration database containing information specifying the predetermined single program transport streams.

14. The apparatus as recited in claim 8:
wherein digital data for each group of a predefined plurality of data packets is received in an Ethernet frame; and
further comprising a packet extractor that removes the group of a predefined plurality of data packets from the Ethernet frame and forwards the group to the input buffer.

15. The apparatus as recited in claim 8 further comprising an output stage that receives the multiple program transport stream and modulates a carrier signal with the multiple program transport stream.

16. The apparatus as recited in claim 15 wherein that carrier signal is associated with a television channel.

17. A method for multiplexing a plurality of single program transport streams into a multiple program transport stream, wherein each single program transport stream (SPTS) is formed by a series of groups each having a predefined plurality of data packets, each data packet contains a packet identifier, each single program transport stream carries a program map table that identifies packet identifiers associated with that respective single program transport stream, the multiple program transport stream carries a program association table that identifies the program map tables for the plurality of single program transport streams that are multiplexed onto the multiple program transport stream, said apparatus comprising:

placing data packets of the plurality of single program transport streams into an input buffer which is configured to hold only the predefined plurality of data packets at any point in time;

reading the data packets from the input buffer, for the data packet read from the input buffer, (1) reassigning a set of unique packet identifiers to the data packets from each single program transport stream, (2) reconfiguring each program map table in the data packets with the set of unique packet identifiers for the respective single program transport stream, (3) generating a program association table that identifies the program map tables for the plurality of single program transport streams, and (4) retaining unaltered the program clock reference in the data packets; and thereafter placing the data packets into a first-in, first-out buffer which combines the data packets into a multiple program transport stream.

18. The method as recited in claim 17 further comprising receiving data from a network and sending only data packets from predetermined single program transport streams to the input buffer.

19. The method as recited in claim 18 wherein the data received from the network comprises an Ethernet frame containing a group of a predefined plurality of data packets, and sending only data packets from predetermined single program transport streams comprises removing the group of a predefined plurality of data packets from the Ethernet frame and placing that group into the input buffer.

20. The method as recited in claim 17 further comprising modulating a carrier signal with the multiple program transport stream.

* * * * *